Patented Mar. 21, 1950

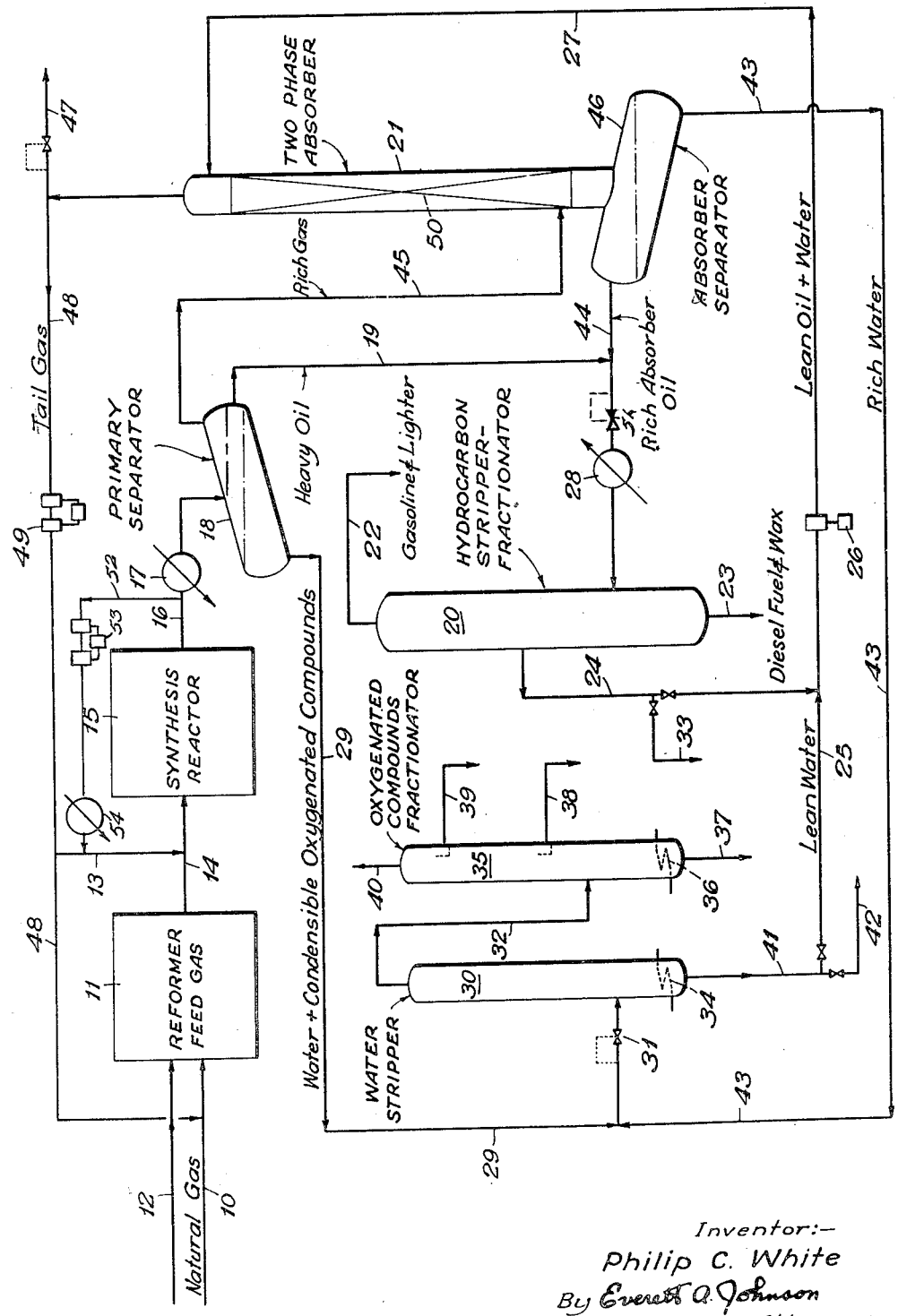

2,501,115

UNITED STATES PATENT OFFICE 2,501,115

SEPARATION OF HYDROCARBON SYNTHESIS PRODUCTS

Philip C. White, Flossmoor, Ill., assignor to Standard Oil Company, Chicago, Ill., a corporation of Indiana Application October 30, 1945, Serial No. 625,552

5 Claims. (Cl. 260—450)

This invention relates to the recovery of generically different types of components from a gas or vapor stream. More particularly, the invention relates to an improved combination of synthesizing hydrocarbons and oxygenated compounds from mixtures of hydrogen and carbon monoxide and of recovering the components of the synthesis products.

In the conversion of hydrogen and carbon monoxide with a synthesis catalyst to produce hydrocarbons having more than one carbon atom to the molecule, a mixture of generically different types of components is produced, including oxygenated compounds and hydrocarbons. A substantial proportion of the synthesis product comprises organic oxygenated compounds and these appear in the produced hydrocarbon liquids, in the water of reaction, and in the gas streams beyond the liquid product recovery.

It is an object of this invention to effect recovery of the synthesis products in a plurality of integrated steps. It is a further object of this invention to recover separately generically different types of components in a reaction product stream. Another object of the invention is to provide a system wherein fractions of the generically different components are utilized in the recovery of additional quantities of similar components from the hydrocarbon synthesis product. Still another object is to provide a method and means for effecting optimum recovery of synthesis products in an efficient and expeditious manner. These and additional objects will become apparent as the description proceeds.

In its broader aspects the objects of this invention are attained by countercurrently contacting a gaseous mixture of generically different components with a multi-phase absorber media comprising immiscible liquids. More particularly, organic oxygenated compounds and hydrocarbons are recovered from a gaseous mixture by flowing the gaseous stream countercurrently to a mixture of immiscible absorber media for the different components to be recovered, separating the immiscible liquid phases, and separately recovering the absorbed materials.

The more specific objects of this invention are attained by cooling an effluent stream at reaction pressure to a temperature within the range of between about 50 and 250° F. and forming two liquid phases in a separator which are withdrawn separately, while the uncondensed stream of rich gas goes over to a two-phase absorber. The two liquid phases formed in the separator are a water phase, including condensable organic oxygenated compounds, and a heavy oil phase. If desired, demulsifying agents can be used to enhance the phase separation in the separators.

At least a fraction of the total effluent stream from the reactor can be diverted to a condenser wherein a partial condensation of the product water is effected. A substantial proportion of the recoverable organic oxygenated compounds is found in this condensed aqueous fraction which is recovered from a primary separator, the water layer comprising between about 2 and about 20% or more of organic oxygenated compounds. These compounds have been identified as including among others: formaldehyde, acetaldehyde, acetone, methyl ethyl ketone and methyl, ethyl, n-propyl and n-butyl alcohols.

The uncondensed stream of rich gas from the product separator is passed counter-current to a two-phase liquid stream of immiscible absorber media such as a mixture of lean oil and lean water. Other immiscible absorbing media can be used although the product water and product hydrocarbons are preferred. Suitable packing or contacting plates can be used to improve the liquid-vapor contact. The lean tail gas goes overhead from the absorber and can be recycled to the reforming or to the synthesis step with or without separation of carbon dioxide as required. The absorber liquids are separated at the bottom of the absorber into different phases and can be combined with the corresponding water or oil phase from the primary separator. The water streams, each rich in organic oxygenated compounds, can then be sent to a stripper, where the oxygenated compounds are distilled overhead below the reactor pressure, e. g. within the range of between about atmospheric and 100 pounds per square inch. The recovered oxygenated compounds can then be separated into relatively pure streams by fractionation or the like.

The invention will be more clearly understood from the following detailed description of a specific example read in conjunction with the accompanying diagrammatic flow sheet which forms a part of this specification and which represents a schematic flow diagram of my improved system.

A methane-containing stream, such as natural gas, is introduced into the system through line 10 into the reformer furnace 11. I prefer natural gas, which normally comprises essentially methane, as the raw material although it should be understood that many features of my process are also applicable to feed gases derived from other sources, such as from coal, shale, and carbonaceous materials in general or from petroleum refining processes. The gases can, for example, be derived from the controlled regeneration of conversion catalysts to produce carbon monoxide and hydrogen. Additional oxidizing gas can be supplied by line 12.

The hydrocarbon gas is reformed to produce the desired hydrogen to carbon monoxide ratio and the mixture is withdrawn from the reformer 11 via line 14. Ordinarily, the hydrogen-carbon monoxide mixture will be in the approximate ratio of between about 1 to 1 and 3 to 1. A feed gas mixture containing hydrogen and carbon monoxide in the ratio of between about 1 and 3.0 to 1 can be prepared by reforming natural gas either with oxygen, water, carbon dioxide, or admixtures of any of these at a temperature of between about 1400 and about 1800° F. and a pressure of between about atmospheric and 400 pounds per square inch over known types of catalyst. A preferred catalyst is a group VIII metal or metal oxide. It can be supported on a carrier, such as Super Filtrol, celite, silica gel, clay, alumina, or the like. Nickel on alumina is particularly useful at a temperature of about 1600° F. The hydrogen-carbon monoxide mixture is withdrawn from the reformer and introduced into the hydrocarbon synthesis reactor at a pressure of about 300 pounds gauge.

The feed gas from reformer 11, together with recycle gases from line 13 are supplied via line 14 to the synthesis reactor 15. The feed introduced into reactor 15 by line 14 is at a temperature below synthesis temperature. Thus when operating with iron catalyst, the feed is cooled to a temperature of between about 400 and about 600° F. This cooling can be effected by heat exchange with the gases fed to the reformer 11. The reactor 15 may be of the fixed, moving bed or fluidized type, and should be provided with means for abstracting the heat of synthesis to maintain the synthesis temperature within a relatively narrow range. A reactor of the so-called fluidized type, i. e., one designed to maintain finely divided catalyst in dense suspended turbulent or liquid-like phase, is particularly useful for this purpose. The reactor 15 can be operated under a pressure within the approximate range of between about 50 and about 500 pounds or more per square inch and at a temperature within the approximate range of between about 325 and 675° F., for example, 610° F. with an iron-type catalyst at a pressure of about 300 pounds per square inch. A space velocity within the approximate range of between about 100 and 5000, or more, volumes of gas per volume of catalyst within the reactor are contemplated. The gas volumes are measured at 60° F. and under atmospheric pressure and the catalyst volume is based upon the fluidized catalyst within the synthesis reactor. The desired temperature level can be maintained by cooling tubes, by abstracting heat from the catalyst outside the reactor and recycling the cooled catalyst, by injecting cooling fluid directly into the reaction space, etc.

A suitable catalyst for the synthesis is preferably one or more group VIII metals or metal oxides, for example, nickel, iron, or cobalt. A particularly useful catalyst is an iron-type catalyst similar to that used in ammonia synthesis. In some instances it is desirable to include promoters such as metals or metal compounds such as the oxides of aluminum, cerium, magnesium, manganese, thorium, titanium, uranium, zinc, zirconium, and the like. If desired the catalyst can be supported on a suitable carrier such as clay, silica gel, alumina, Super Filtrol, celite, etc.

For use in a fluidized system the catalyst particles are of the order of 2 to 200 microns or larger, preferably 20 to 100 microns in particle size. With vertical gasiform fluid velocities of the order of about 0.5 to 5, preferably between about 1 and 4, for example, about 2 feet per second, a liquid-like dense phase of catalyst is obtained in which the bulk density is between about 30 and about 90 percent, preferably between about 40 and about 80, e. g. about 60 percent of the density of the settled catalyst material within the reactor.

It has been observed that the absolute density of the catalyst particles decreases with the on-stream time and therefore it is contemplated that the vertical gasiform velocities can be diminished and/or the quantity of catalyst reduced to maintain the desired fluidized bulk density within the reactor.

The catalyst material is continuously settled from the reaction products within the reactor 15, any residual catalyst in product line 16 being removable by water scrubbing, cyclone separators, or the like. However, since the catalyst recovery system is not a feature of the present invention, further details have not been described.

The product stream in line 16 is cooled in partial condenser 17 and the cooled mixture introduced into primary separator 18 wherein phase separation is effected. At high space velocities of 500 to 5000, partial recycle of the product stream to reactor 15 can be made. This can be accomplished by passing part of the effluent via lines 16 and 52, compressor or blower 53, and cooler 54 to lines 13 and 14. A liquid hydrocarbon product stream is withdrawn from the primary separator 18 via line 19 in which a pressure reducing valve 51 is provided, heated if desired in heater or exchanger 28, and introduced into the hydrocarbon stripper-fractionator 20. In the stripper 20 the hydrocarbon product is separated into a Diesel fuel and wax fraction, a gasoline and lighter hydrocarbon fraction, and a gas oil fraction suitable for use in the two-phase absorber 21. The gasoline and lighter fraction is recovered overhead via line 22 and may be subjected to further fractionation and/or treatment as desired. The Diesel fuel and wax hydrocarbons can be withdrawn from the system via line 23 as bottoms. The lean absorber oil is withdrawn from the fractionator 20 via line 24 and commingled with lean water from line 25. The mixture of lean water and lean absorber oil is introduced via pump 26 and line 25 into the two-phase absorber 21. The absorber 21 can be provided with a packing or with trays 50 to increase the contacting efficiency of the tower. The net production of the absorber oil fraction can be withdrawn via line 33 and can be catalytically treated and/or fractionated as desired.

Liquid water and dissolved condensable organic oxygenated compounds are withdrawn from the primary separator 18 via line 29 and introduced into the water stripper 30 together with rich water from the absorber or secondary separator described hereinafter. The oxygenated compounds will comprise between about 10 and about 70 mol percent of the aqueous phase introduced into the water stripper 30. A pressure reducing valve 31 is provided on line 29 and the water stripper 30 is operated at a pressure of between about atmospheric and about 100 pounds per square inch. The rich water is introduced into the stripper 30 at a temperature of about 150° F. and a heat source 34 is provided near the base of stripper 30. The overhead from the stripper 30 comprises essentially the oxygenated compounds, together with a minor proportion of water. If desired, open steam can be introduced at a low point in stripper 30 to provide heat. The overhead from 30 can be passed by line 32 into a cooler and a collection drum (not shown) which may be operated at about atmospheric pressure and a temperature of about 120° F. A portion of the condensate liquid from the collection drum can be returned to the stripper as reflux with the major portion of the condensate being supplied to the oxygenated compound fractionator 35. In the system illustrated, the oxygenated compounds are introduced via line 32 into the fractionator 35 for recovery of the relatively pure oxygenated compound fractions, a heat source 36 being provided near the base of tower 35. Oxygenated compound fractions or concentrates can be recovered by two or more lines 37, 38, 39 or 40.

Lean water from the water stripper 30 can be withdrawn from the process via line 41 and a portion can be supplied by line 25 and pump 26, together with lean absorber oil from line 24 to the two-phase absorber 21. The lean water from line 41 can be supplied to the reformer 11 via line 12. The lean water withdrawn from the system via line 42 represents the net production of reaction water.

The rich gas from primary separator 18 is introduced via line 45 at a low point into the two-phase absorber 21. Within the absorber 21 the water-soluble and the oil-soluble constituents of the rich gas are recovered by the two-phase mixture and carried downwardly into the absorber separator 46. The residual gases from absorber 21 are rich in hydrogen and low molecular weight hydrocarbons and if desired these gases can be passed through a charcoal adsorber for recovery of hydrocarbons or a carbon dioxide removal step before being recycled or vented from the system. These lean tail gases can be reduced in pressure and vented by line 47. Alternatively, all or a portion of the gases can be recycled via lines 48 and 10 to the reformer 11 and/or via lines 48 and 13 to synthesis reactor 15. Compressor or blower 49 can be provided on line 48. It is also contemplated that the CO2 can be removed from the tail gases and supplied to the reformer 11 and any unconverted feed recycled to the reactor 15.

In the separator 46 the rich liquids from the absorber 21 form two liquid phases. The rich water fraction is withdrawn from absorber separator 46 via line 43 and supplied to the water stripper 30 for the recovery of the oxygenated compounds as described. The rich absorber oil phase is withdrawn from the separator 46 via line 44 and commingled with the hydrocarbon product fraction withdrawn by line 19 from the primary separator 18. The commingled stream is then heated in 28 and supplied to the fractionator-stripper 20. Alternatively, a separate stripper system (not shown) may be provided for the rich absorber oil.

If desired, the liquid hydrocarbon product fractions in lines 19 and 44 from separators 18 and 46, which include oil-soluble oxygenated compounds, can be catalytically finished. For example, the product fraction can be heated to a temperature of between about 750 and 800° F. and contacted with a cracking catalyst to convert the oxygenated compounds to olefins. Such an operation does not effect any reforming or cracking and the octane number improvement results from the conversion of the oxygenated compounds to olefins. However, this catalytic finishing can be conducted at a higher temperature of the order of between 925° F. and about 975° F. which not only converts the oxygenated compounds to hydrocarbons but also effects reforming of the gasoline hydrocarbons and cracking of the heavier hydrocarbon product to produce a material of improved antiknock and of lower molecular weight.

It is also contemplated that instead of employing a single primary separator, I may provide a means for cooling the reaction product in stages and separation of phases between the cooling stages. Thus, the product stream can be initially cooled to a temperature of about 450° F. to effect recovery of heavy hydrocarbon products and waxes. The remainder of the gasiform product can then be further cooled to a temperature of about 20 to 100° F. below the boiling point of the water at the partial pressure of water existing in the product stream. A liquid water fraction can then be recovered which is substantially free of any condensible oxygenated compounds. Further cooling of the gasiform product stream will permit the separation of a concentrated solution of oxygenated compounds as the water phase. When fractional condensation is employed, the pure water fraction can be used in the two-phase absorber, the oxygenated compounds being subsequently removed and the water discarded.

Although fractionation has been described as the means of recovering the oxygenated compounds present in the aqueous phase from separator 18 and absorber 21, it is to be understood that other means can be employed. The stream of oxygenated compounds and water in lines 29 and 43 can be treated by any method to recover the separate components as desired. Other means may be used for recovery of the oxygenated compounds in the aqueous phase such as extraction with a suitable solvent or conversion of the alcohols present to the more volatile aldehydes and ketones and subsequent recovery of all aldehydes and ketones present by stripping or by the addition of sodium bisulfite to precipitate the compounds formed with regeneration of the aldehydes and ketones by the addition of acid. Constant boiling mixtures with water may be formed and the azeotropes can be recovered as such.

From the above description it will be apparent that my invention provides a novel method and means for the recovery of products from a hydrocarbon synthesis and a system for attaining the objects of my invention. However, to simplify the description, valves, pumps and similar control means have not always been included. It is also contemplated that the exothermic heat of the reaction can be utilized in supplying heat to the stripping and fractionation step.

It is to be understood that although my invention has been described with reference to an illustrative example, the invention is not restricted thereto and that modifications by those skilled in the art are contemplated without departing from the spirit of the invention defined by the appended claims.

What I claim is:

1. In the process of separating organic oxygenated compounds and hydrocarbons from vaporous mixtures thereof obtained by the hydrogenation of carbon monoxide, the improvement which comprises effecting partial condensation of the vaporous mixture, separating a liquid water phase including condensible organic oxygenated compounds, a liquid hydrocarbon phase, and a rich gas phase, stripping organic oxygenated compounds from the water phase, separating an absorber oil fraction from the liquid hydrocarbon, contacting the said rich gas phase simultaneously with at least a portion of the lean water and of the absorber oil, separating the rich absorber media into a rich liquid water phase and a rich liquid hydrocarbon phase, stripping absorbed gaseous hydrocarbons from the liquid absorber oil, stripping organic oxygenated compounds from the rich water fraction, and recycling at least a portion of the stripped absorber oil to the rich gas contacting step.

2. In a process for separately recovering organic oxygenated compounds and hydrocarbons from the vaporous product stream obtained in the catalytic hydrogenation of carbon monoxide, the steps which comprise (1) partially condensing said vaporous product stream and withdrawing therefrom a gas phase containing hydrocarbons and organic oxygenated compounds; (2) stratifying the condensate liquid and separately withdrawing therefrom a liquid aqueous phase and a liquid hydrocarbon phase, both of said phases containing organic oxygenated compounds; (3) separating organic oxygenated compounds from said liquid aqueous phase; (4) separating a lean absorber oil fraction from said liquid hydrocarbon phase; (5) commingling a portion of the resulting lean aqueous phase with said lean absorber oil fraction; and (6) countercurrently contacting said gas phase with the commingled lean aqueous phase and lean absorber oil fraction, whereby organic oxygenated compounds are selectively absorbed in the liquid aqueous phase and normally gaseous hydrocarbons are selectively absorbed in the absorber oil fraction.

3. The process of claim 2 including the additional steps of (7) stratifying and separating the resulting enriched liquid phases; and (8) separately withdrawing absorbed organic oxygenated compounds and absorbed hydrocarbons respectively from the enriched aqueous and enriched absorber oil phases.

4. The process of claim 3 including the additional step of (9) recycling at least a portion of the lean aqueous and absorber oil phases to the gas-contacting operation in step 6.

5. In a process for separately recovering organic oxygenated compounds and hydrocarbons from the vaporous product stream obtained in the catalytic hydrogenation of carbon monoxide, the steps which comprise (1) partially condensing said vaporous product stream at an elevated temperature within the range of about 20 to 100° F. below the boiling point of water at the partial pressure of water existing therein; (2) stratifying the resulting condensate liquid; (3) separating and withdrawing from said condensate liquid a first aqueous phase containing not more than a minor proportion of organic oxygenated compounds; (4) further cooling and condensing the residual vaporous product stream and withdrawing therefrom a gas phase containing hydrocarbons and organic oxygenated compounds; (5) stratifying the condensate liquid from step 4 and separately withdrawing therefrom a second aqueous phase and a liquid hydrocarbon phase, both of said phases being rich in organic oxygenated compounds; (6) separating a lean absorber oil fraction from said liquid hydrocarbon phase; (7) commingling a portion of said first aqueous phase with said lean absorber oil fraction; and (8) countercurrently contacting said gas phase with the commingled first aqueous phase and lean absorber oil fraction, whereby organic oxygenated compounds are selectively absorbed in the liquid aqueous phase and normally gaseous hydrocarbons are selectively absorbed in said lean absorber oil fraction.

PHILIP C. WHITE.

REFERENCES CITED

The following references are of record in the file of this patent:

UNITED STATES PATENTS

| Number | Name | Date |
|---|---|---|
| 2,083,125 | Scheuble | June 8, 1937 |
| 2,216,549 | Deansley | Oct. 1, 1940 |
| 2,274,750 | Soenksen | Mar. 3, 1942 |
| 2,279,052 | Michael | Apr. 7, 1942 |
| 2,299,790 | Bludworth | Oct. 27, 1942 |
| 2,347,682 | Gunness | May 2, 1944 |